United States Patent
Jo

(10) Patent No.: US 10,114,508 B2
(45) Date of Patent: Oct. 30, 2018

(54) DISPLAY DEVICE AND COMMUNICATION METHOD

(71) Applicant: SEIKO EPSON CORPORATION, Tokyo (JP)

(72) Inventor: Hiroaki Jo, Jakarta (ID)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 15/264,905

(22) Filed: Sep. 14, 2016

(65) Prior Publication Data

US 2017/0123588 A1    May 4, 2017

(30) Foreign Application Priority Data

Nov. 2, 2015  (JP) ................. 2015-215750

(51) Int. Cl.
   *G06F 3/041* (2006.01)
   *G06F 3/042* (2006.01)
(52) U.S. Cl.
   CPC .......... *G06F 3/0418* (2013.01); *G06F 3/0412* (2013.01); *G06F 3/0421* (2013.01)

(58) Field of Classification Search
   None
   See application file for complete search history.

(56) References Cited

U.S. PATENT DOCUMENTS

2010/0026656 A1*  2/2010  Hotelling ............... G06F 3/044
                                                            345/174
2014/0118301 A1*  5/2014  Cho ...................... G06F 3/0416
                                                            345/174

FOREIGN PATENT DOCUMENTS

JP          2014-211841 A     11/2014

\* cited by examiner

*Primary Examiner* — Nicholas Lee

(57) ABSTRACT

A display device includes a touch panel; a drive circuit that controls the touch panel; an arithmetic circuit that calculates operation content on the touch panel; and a control circuit that controls the arithmetic circuit, in which the drive circuit includes a first wiring for outputting information for calculating the operation content on the touch panel to the arithmetic circuit; and a second wiring for outputting a signal indicating that the touch panel is operated to the control circuit.

6 Claims, 4 Drawing Sheets

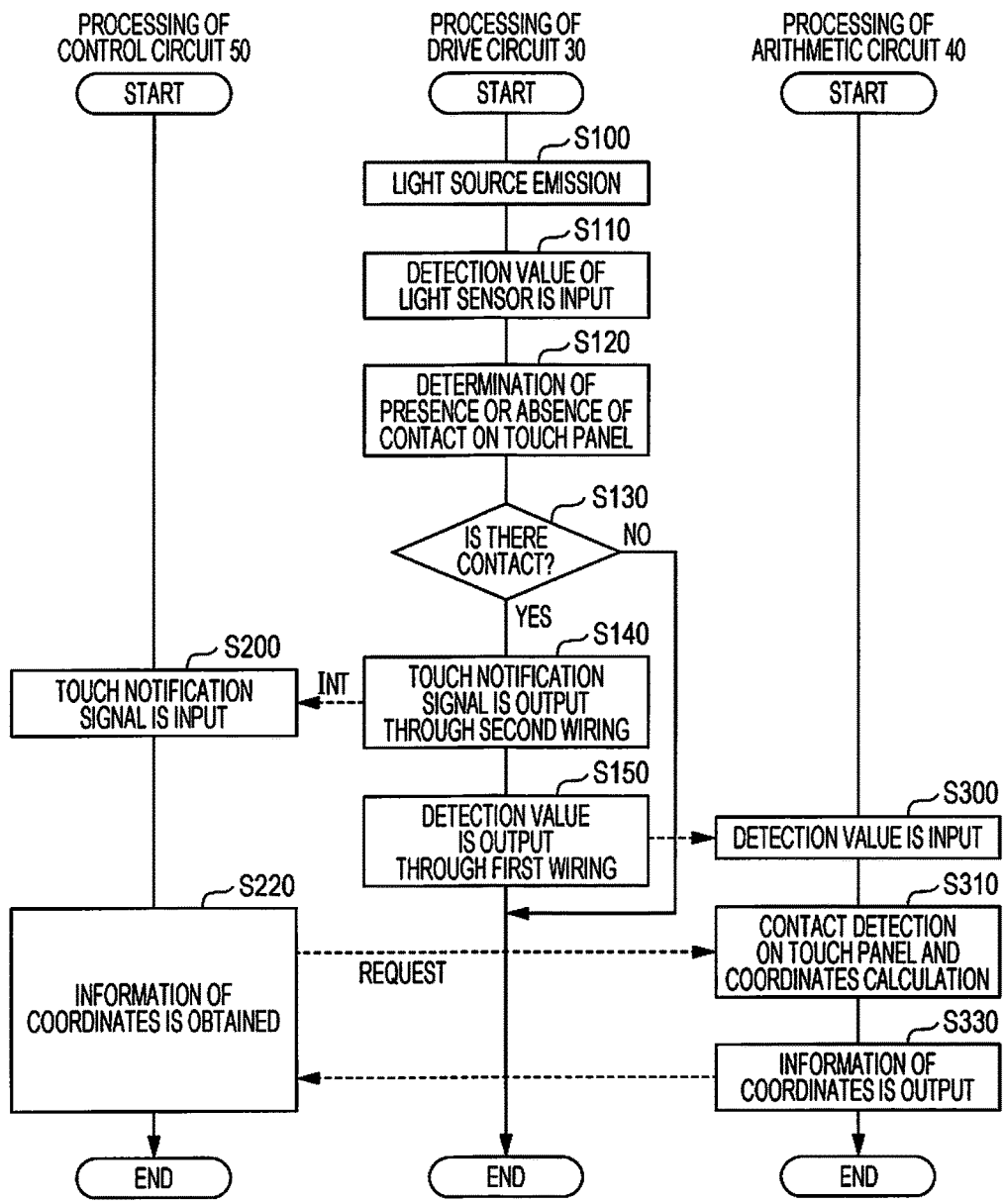

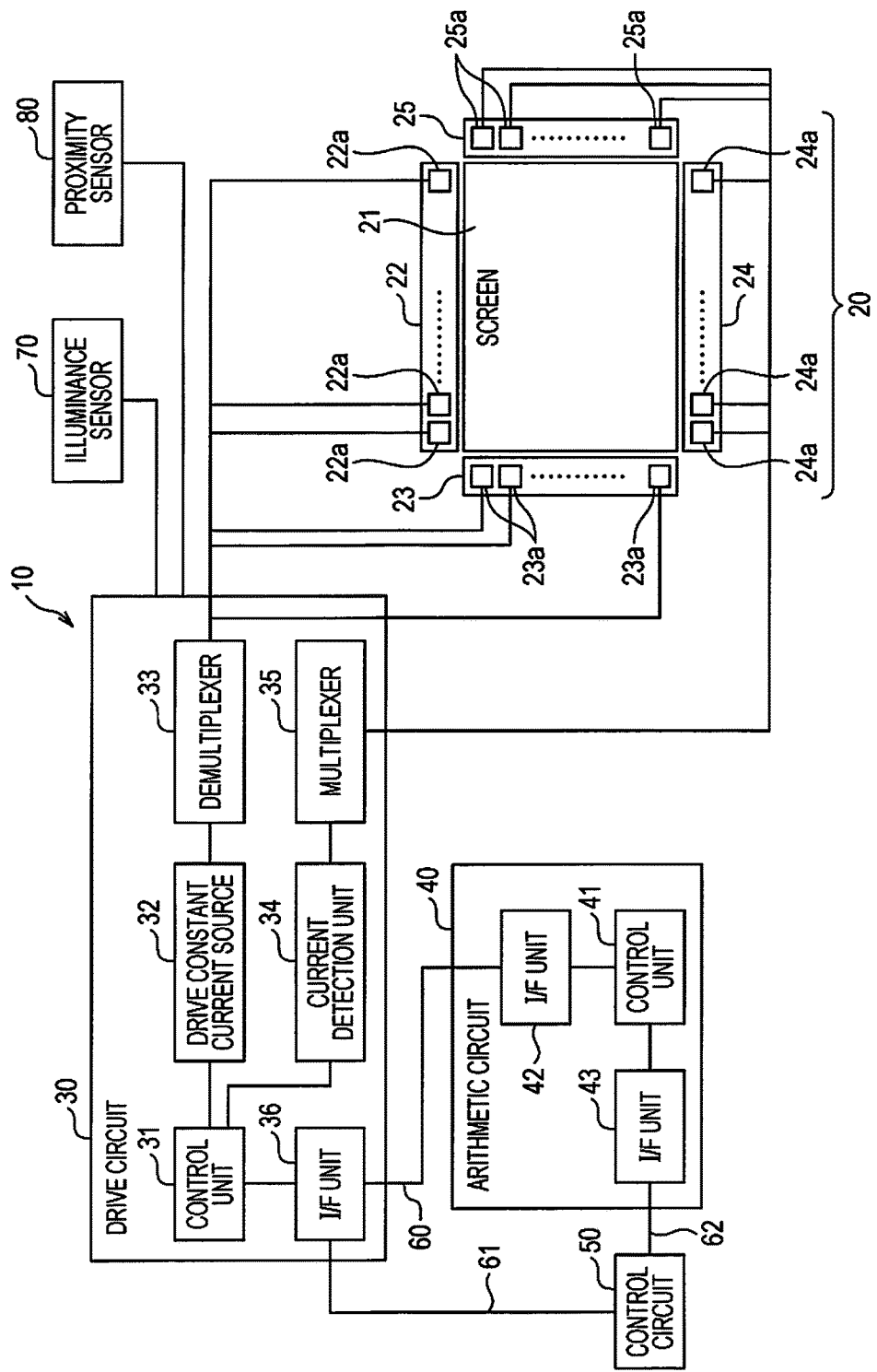

DISPLAY DEVICE AND COMMUNICATION METHOD

CROSS REFERENCES TO RELATED APPLICATIONS

The entire disclosure of Japanese Patent Application No. 2015-215750, filed Nov. 2, 2015 is incorporated by reference herein.

BACKGROUND

1. Technical Field

The present invention relates to a display device and a communication method performed by the display device.

2. Related Art

A display device including a touch panel is known. In the display device, in a case where there is contact (hereinafter, contact on touch panel) between a screen of the touch panel and a finger of a user or a thing other than the finger, the coordinates of a position where there is the contact are calculated, and subsequent processing is performed according to a result of the calculation.

There are a variety of specific configurations of the touch panel. For example, an optical touch panel device including a plurality of light emitting elements arranged along vertical and horizontal sides of a display, a plurality of light receiving elements arranged along a side opposite to a side of the display where the plurality of light emitting elements are arranged, a touch panel controller for driving the light emitting elements and detecting the presence or absence of the reception of light of the light receiving elements, and a microcomputer, is known (see JP-A-2014-211841).

The display device including the touch panel adopts a configuration including a drive circuit that controls driving of the touch panel, an arithmetic circuit that performs calculation of the coordinates, a microprocessor that integrally controls the display device, and the like. In the configuration, the arithmetic circuit of the related art detects the presence or absence of the contact on the touch panel in response to a signal output from the drive circuit, and performs the calculation of the coordinates. The arithmetic circuit notifies the microprocessor of the fact that there is contact on the touch panel by an interrupt, at a timing in which the calculation of the coordinates is completed. Accordingly, the microprocessor receives the notification, and reads information of coordinates calculated by the arithmetic circuit from the arithmetic circuit.

In the configuration, there is room to reduce a time from when there is the contact on the touch panel to when the microprocessor starts processing in response to the information of the coordinates. In addition, study for enhancing the power saving effect is also demanded.

SUMMARY

An advantage of some aspects of the invention is to provide a more improved display device and a communication method.

According to an aspect of the invention, there is provided a display device including: a touch panel; a drive circuit that controls the touch panel; an arithmetic circuit that calculates operation content on the touch panel based on an output of the drive circuit; and a control circuit that controls the arithmetic circuit, in which the drive circuit includes a first wiring for outputting information for calculating the operation content on the touch panel to the arithmetic circuit in a case where the touch panel is operated; and a second wiring for outputting a signal indicating that the touch panel is operated to the control circuit in a case where the touch panel is operated.

According to the configuration, in a case where the touch panel is operated, the drive circuit outputs information for calculating operation content on the touch panel to the arithmetic circuit through the first wiring for connecting the drive circuit and the arithmetic circuit, and the drive circuit outputs a signal indicating that the touch panel is operated to the control circuit through the second wiring for connecting the drive circuit and the control circuit. That is, the control circuit is notified of a fact that there is the contact on the touch panel, at a timing earlier than that of completing the calculation by the arithmetic circuit. With this, a time from when there is the contact on the touch panel to when the control circuit starts processing according to a result of the calculation, becomes shorter than that in the related art. In other words, it is possible to further speed up a response with respect to the operation of a user.

In the aspect of the invention, the second wiring may be a wiring for connecting the drive circuit and the control circuit not through the arithmetic circuit.

According to the configuration, it is easy to shorten the second wiring since the second wiring connects the drive circuit and the control circuit not through the arithmetic circuit.

In the aspect of the invention, the touch panel may include a screen, a plurality of light sources, and a plurality of light sensors, and have a configuration in which light emitted from the light source is incident on the light sensor passing through a space above the screen, and the drive circuit may output the signal to the second wiring when a change in an amount of the light incident on the light sensor is equal to or greater than a threshold value.

According to the configuration, it is possible to speed up a response with respect to the operation of a user on an optical touch panel.

In the aspect of the invention, the control circuit may be able to instruct the arithmetic circuit to transition to a sleep state, the arithmetic circuit may transition to the sleep state by stopping at least a function of the calculation in a case where the arithmetic circuit is instructed to transition to the sleep state, and the drive circuit may return the arithmetic circuit from the sleep state by outputting the information for calculating operation content on the touch panel to the arithmetic circuit through the first wiring in a case where the touch panel is operated.

According to the configuration, when the display device including the arithmetic circuit is in the sleep state, the power consumption reduction effect is achieved by reducing at least a function of the arithmetic circuit. In addition, even when the display device is in the sleep state, in a case where the touch panel is operated, the control circuit is notified of a fact that there is contact on the touch panel at a timing earlier than a timing where the arithmetic circuit completes the calculation. With this, a time (return time from sleep state) from reception of an operation by a user to response to the operation for the sleep state, is shortened.

In the aspect of the invention, the display device may further include a detector that detects a predetermined change of an external environment, in which in a case where the predetermined change is detected by the detector, the drive circuit may output a signal equivalent to the signal indicating that the touch panel is operated to the control circuit through the second wiring.

According to the configuration, even in a case where the predetermined change of the external environment is detected by the detector, notification from the drive circuit is issued to the control circuit through the second wiring, in addition to a case where the touch panel is operated.

A technical idea of the invention is also realized by other means than the display device. For example, it is also possible to treat processing by the display device as an invention of a method (communication method performed by display device). In addition, it is also possible to treat a program which causes the method to be executed in hardware (for example, computer included in display device) as an invention. In addition, it is also possible to treat a computer readable storage medium or the like in which the program is stored as an invention. Each component may not be independent from one another, for example, a plurality of circuits may be packaged as one.

BRIEF DESCRIPTION OF THE DRAWINGS

Hereinafter, an embodiment of the invention will be described with reference to the accompanying drawings, wherein like numbers reference like elements.

FIG. 3 is a flowchart illustrating another example of the processing performed by the display device.

FIG. 4 is a block diagram illustrating another example of the display device.

DESCRIPTION OF EXEMPLARY EMBODIMENTS

Hereinafter, an embodiment of the invention will be described with reference to drawings.

Figure 1:
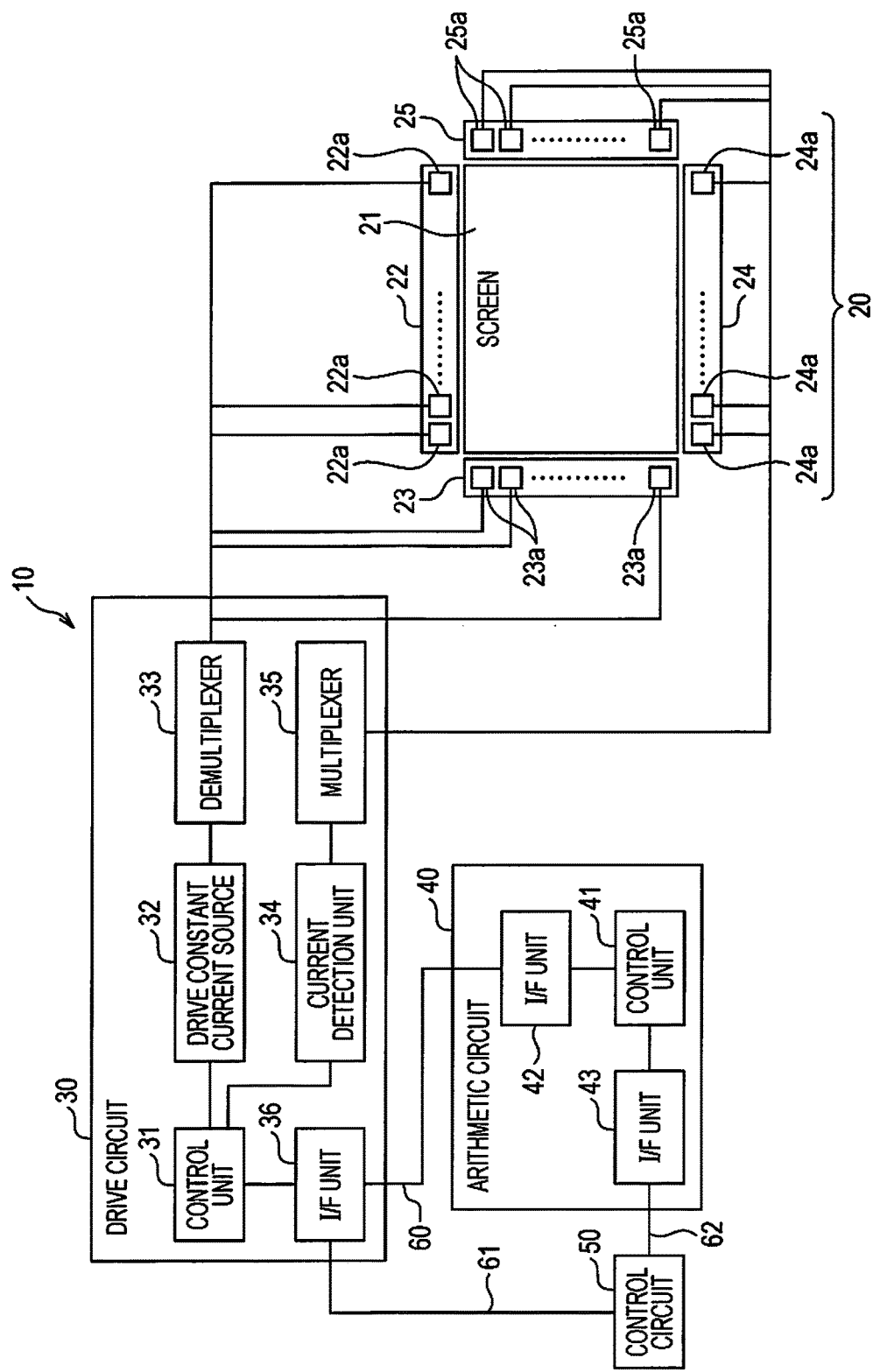
FIG. 1 is a block diagram illustrating an example of a display device.

FIG. 1 illustrates a block diagram of an example of a display device 10 according to the embodiment. The display device 10 includes, approximately, a touch panel 20, a drive circuit 30 that controls the touch panel 20, an arithmetic circuit 40 that calculates operation content on the touch panel 20 based on the output of the drive circuit 30, and a control circuit 50 that controls the arithmetic circuit 40. The control circuit 50 is a unit that integrally controls the behavior of each component of the display device 10 including the arithmetic circuit 40 based on programs, and is substantively configured by a microprocessor (MPU), a memory, and the like.

The display device 10, for example, is collectively referred to as a device including a configuration illustrated in FIG. 1. Accordingly, the display device that also functions as the touch panel is referred to as the display device 10, and an electronic apparatus including a part of the display device that also functions as the touch panel is referred to as the display device 10. Such an electronic apparatus can include various products, for example, printers, facsimiles, scanners, copy machines, multi-function printers (MFP, so-called multifunction machine), PCs, and the like. Accordingly, FIG. 1 illustrates only a part of a configuration included in the display device 10.

In an example of FIG. 1, the touch panel 20 is an optical touch panel. The touch panel 20 includes a screen 21, light source units 22 and 23, and light receiving units 24 and 25. For example, the screen 21 is a liquid crystal display, and displays various information relating to the display device 10 to a user under the control of the control circuit 50. The light source unit 22 includes a plurality of light sources 22a arranged along a side of the screen 21, in the outside of a rectangle screen 21. The light receiving unit 24 including a plurality of light sensors 24a arranged along the opposite side is provided on the outside of a side of the screen 21 opposite to the side. Meanwhile, the light source unit 23 includes a plurality of light sources 23a arranged along a side adjacent to a side in which the light source unit 22 is provided, on the outside of the screen 21. In addition, the light receiving unit 25 including a plurality of light sensors 25a arranged along the opposite side is provided, on the outside of the side of the screen 21 opposite to the side in which the light source unit 23 is provided. For example, the plurality of light sources 22a and 23a are a plurality of LEDs, and the plurality of light sensors 24a and 25a, for example, are a plurality of photodiodes.

The drive circuit 30 includes a control unit 31, a drive constant current source 32, a demultiplexer 33, a current detection unit 34, a multiplexer 35, an interface (I/F) unit 36, and the like. The control unit 31 is configured by a CPU, a memory, and the like. The control unit 31 generates a constant current for emitting the plurality of light sources 22a and 23a in the drive constant current source 32, and outputs the constant current to the demultiplexer 33. The demultiplexer 33 sequentially distributes the current output from the drive constant current source 32 to each of the light sources 22a and 23a. With this, each of the plurality of light sources 22a and 23a is emitted. Light emitted from a certain light source 22a passes through on the screen 21 (proceeds along screen 21), and is incident on the opposite light sensors 24a. Similarly, light emitted from a certain light source 23a passes through on the screen 21, and is incident on the opposite light sensors 25a.

Each of the light sensors 24a and 25a outputs a current value (detection value) corresponding to an incident light amount to the multiplexer 35. The multiplexer 35 outputs the detection value input from the plurality of light sensors 24a and 25a one by one (in light sensor unit basis) to the current detection unit 34. The current detection unit 34 performs A/D conversion on the detection value input from the multiplexer 35, and outputs the A/D converted result to the control unit 31. The control unit 31 receives a detection value converted into a digital value from the current detection unit 34, and outputs the detection value to the arithmetic circuit 40 through the I/F unit 36. The drive circuit 30 periodically repeats the emission of the plurality of light sources 22a and 23a, and the outputting of the detection value obtained from the plurality of light sensors 24a and 25a to the arithmetic circuit 40.

The arithmetic circuit 40 includes a control unit 41, an I/F unit 42, an I/F unit 43, and the like. The control unit 41 is configured by a CPU, a memory, and the like. The I/F unit 36 of the drive circuit 30 and the I/F unit 42 of the arithmetic circuit 40 are connected by a first wiring 60. Accordingly, the detection value is output from the drive circuit 30 to the arithmetic circuit 40 via the first wiring 60. In addition, the arithmetic circuit 40 is connected to the control circuit 50 by a third wiring 62 through the I/F unit 43.

The arithmetic circuit 40 is a logic circuit. Meanwhile, the drive circuit 30 includes a lot of analog circuits. Therefore, in view of cost and miniaturization, reduction of power consumption, or the like, each of the arithmetic circuit 40 and the drive circuit 30 is an integrated circuit manufactured in a separate process. However, the arithmetic circuit 40 and the drive circuit 30 manufactured in the separate process may be mounted in one package.

In a case where a user touches a certain position on the screen 21 by the finger or a thing other than the finger, that is, in a case where there is contact on the touch panel 20, light incident from a part of the light sources 22a and 23a to a part of the light sensors 24a and 25a is blocked by the finger or the like. As a result, the detection value is reduced by a part of the light sensors 24a and 25a. In a case where there is no contact on the touch panel 20, such reduction in the detection value by the light sensors 24a and 25a is not observed. In other words, in a case where a detection value by a certain light sensor is equal to or less than a predetermined value or a difference with a detection value by another light sensor is equal to or greater than the predetermined value, a case where the quantity of light incident on the optical sensor is changed equal to or greater than a threshold value compared with the detection value which is stored immediately before, a case where two or more of the cases are generated, or the like, it is possible for an optical sensor to detect contact at a corresponding position on the touch panel 20. It is possible to appropriately set a condition of whether or not there is contact.

Accordingly, the control unit 41 of the arithmetic circuit 40 detects the presence or absence of contact on the touch panel 20 by reading the level of the detection value in each of the light sensors 24a and 25a received via the first wiring 60 and the I/F unit 42. In a case where there is contact on the touch panel 20, it is possible to calculate a position (coordinates on the screen 21) where there is the contact. For example, when the arrangement of a plurality of light sensors 24a constituting the light receiving unit 24 is referred to as an X array and the arrangement of a plurality of light sensors 25a constituting the light receiving unit 25 is referred to as a Y array, the control unit 41 performs calculation for specifying coordinates in the X array of the light sensors 24a in which a detection value equal to or less than the predetermined value is obtained, and coordinates in the Y array of the light sensors 25a in which a detection value equal to or less than the predetermined value is obtained. With this, the coordinates on the screen 21 where there was the contact are found. In this case, the first wiring 60 is regarded as a wiring for outputting information for calculating operation content on the touch panel 20 to the arithmetic circuit 40 in a case where the touch panel 20 is operated (case where there was contact on touch panel 20). The information for calculating the operation content indicates a detection value in which a level is lowered as described above compared to a case where there is no contact on the touch panel 20.

Furthermore, in the embodiment, the I/F unit 36 of the drive circuit 30 and the control circuit 50 are connected by a second wiring 61. As will be described in detail below, the second wiring 61 corresponds to a wiring for outputting a signal (hereinafter, touch notification signal) indicating that the touch panel 20 is operated to the control circuit 50, in a case where the touch panel 20 is operated.

Next, a sleep state of the display device 10 will be simply described. An electronic device transitions to the sleep state (referred to as power consumption mode, power saving mode, or the like) by limiting, stopping, or the like a function thereof in a case where a situation such as the electronic device is not used or the like is continued to some extent, in order to reduce power consumption. For example, if the display device 10 actually is an MFP, the MFP transitions from a normal state (state that does not limit function) to the sleep state, in a case where a situation in which there is no instruction or communication from outside is continued for a predetermined time or more, or the like. In the embodiment, the description of a determination criteria for transitioning from the normal state to the sleep state will be omitted. In the example of FIG. 1, the control circuit 50 performs the determination in any event.

In a case where it is determined that the normal state transitions to the sleep state, the control circuit 50 instructs the transition to the sleep state to each configuration within the display device 10 including the drive circuit 30 and the arithmetic circuit 40. In addition, in a case where it is determined that the normal state transitions to the sleep state, the control circuit 50 limits or stops at least a part of the function of the control circuit 50, and the control circuit 50 also transitions to the sleep state. However, the control circuit 50 does not stop a function for receiving a signal from outside even after the transition to the sleep state.

The control unit 41 of the arithmetic circuit 40 causes the arithmetic circuit 40 to transition to the sleep state, by stopping a part of the function including at least a function of the calculation, in a case where an instruction to the transition of the sleep state described above is received. The arithmetic circuit 40 transitioned to the sleep state stops a function other than the reception of a signal from outside by, for example, the I/F units 42 and 43.

In a case where the instruction of the transition to the sleep state is received, by completing display of the screen 21, the control unit 31 of the drive circuit 30 stops the power supply to the screen 21. However, by continuing drive controlling of the light sources 22a and 23a or the light sensors 24a and 25a, the touching can be detected even in the sleep state. In this case, when the drive circuit 30 transitions to the sleep state, by controlling the drive constant current source 32 or the demultiplexer 33, the control unit 31 may lengthen a period (time from emitting of one light source to emitting of the next one light source) for emitting the light sources 22a and 23a more than a period of a corresponding light source in the normal state. In addition, when the drive circuit 30 transitions to the sleep state, by controlling the current detection unit 34 or the multiplexer 35, the control unit 31 may lengthen a period in which the detection value is received for every one of the light sensors 24a and 25a more than a corresponding period in the normal state. In addition, when the drive circuit 30 transitions to the sleep state, by controlling the demultiplexer 33, the control unit 31 may decrease the number of the light sources 22a and 23a that are emitted to be smaller than a corresponding number in the normal state.

In addition, in a case where it is determined that the normal state transitions to the sleep state, the control circuit 50 may turn off the screen 21 by controlling the screen 21.

Figure 2:
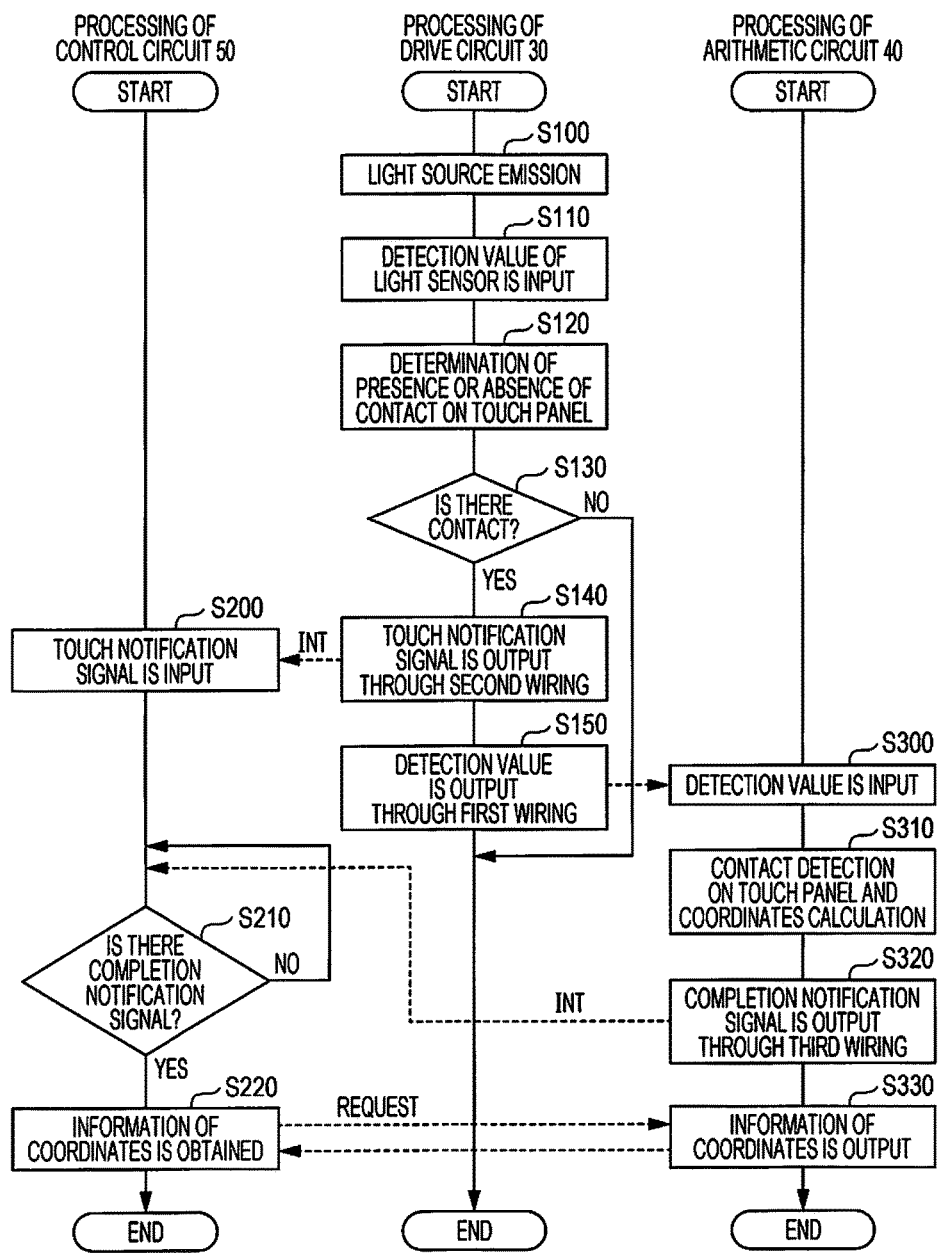
FIG. 2 is a flowchart illustrating an example of processing performed by the display device.

FIG. 2 is a flowchart exemplifying processing performed by the display device 10 in the embodiment. At least a part of the processing represents a communication method according to the invention. In addition, in FIG. 2, processing (steps S100 to S150) performed by the control unit 31 of the drive circuit 30, processing (steps S200 to S220) performed by the control circuit 50, and processing (steps S300 to S330) performed by the control unit 41 of the arithmetic circuit 40 are illustrated in parallel. Processing illustrated in FIG. 2 is performed even in a case where the display device 10 is in the normal state or in the sleep state. Hereinafter, a case where the display device 10 performs processing illustrated in FIG. 2 in the sleep state will be adopted as an example, and will be described.

In step S100, the control unit 31 of the drive circuit 30 emits the plurality of light sources 22a and 23a by controlling the drive constant current source 32 or the like as described above.

In step S110, as described above, the control unit 31 receives a detection value for each of a plurality of light sensors 24a and 25a which is converted to a digital value from the current detection unit 34.

Since light from the plurality of light sources 22a and 23a is detected in the plurality of light sensors 24a and 25a, step S100 and step S110 are performed approximately at the same time.

In steps S120 to S140, the control unit 31 outputs the touch notification signal to the second wiring 61 according to a light amount incident on a photodetector being changed equal to or greater than a threshold value. First, in step S120, the control unit 31 determines the presence or absence of the contact on the touch panel 20 based on the detection value received in step S110. For example, in a case where a detection value equal to or less than the predetermined value is received, the control unit 31 determines that there is contact on the touch panel 20. In a case where it is determined that there is the contact on the touch panel 20 ("Yes" in step S130), the control unit 31 proceeds to step S140, and in a case where it is determined that there is no contact on the touch panel 20 ("No" in step S130), the control unit 31 completes the flowchart of FIG. 2. After completing the flowchart, the control unit 31 repeatedly performs the flowchart. In a case where it is determined that there is contact on the touch panel 20 in the sleep state, the control unit 31 returns the drive circuit 30 to the normal state as a response to the determination.

In step S140, the control unit 31 outputs the touch notification signal to the control circuit 50, by an interrupt (INT) through the I/F unit 36 and the second wiring 61.

In step S150, the control unit 31 outputs the detection value to the arithmetic circuit 40 through the I/F unit 36 and the first wiring 60. Among detection values output to the arithmetic circuit 40 in step S150, a detection value of which a level is reduced as described above compared to the case where there is no contact on the touch panel 20, is naturally included.

With this, the control unit 31 completes the flowchart of FIG. 2. After determining that there is the contact on the touch panel 20, timing (timing for performing step S140) in which the control unit 31 outputs the touch notification signal to the control circuit 50 may be timing after the timing (timing for performing step S150) in which the detection value is output to the arithmetic circuit 40, and these pieces of timing may be performed approximately at the same time.

Meanwhile, the control circuit 50 receives the touch notification signal via the second wiring 61 (step S200). If the control circuit 50 is in the sleep state when the touch notification signal is received, the control circuit 50 returns to the normal state as a response to the input. When the touch notification signal is received via the second wiring 61 in the normal state (step S200), the control circuit 50 subsequently also remains in the normal state.

The control unit 41 of the arithmetic circuit 40 receives the detection value via the first wiring 60 (step S300). If the control unit 41 is in the sleep state when the detection value is received, the control unit 41 returns the arithmetic circuit 40 to the normal state as a response to the input. When the detection value is received via the first wiring 60 in the normal state (step S300), the arithmetic circuit 40 subsequently also remains in the normal state.

In step S310, the control unit 41 detects the presence or absence of the contact on the touch panel 20, based on the detection value input in step S300 (in this case, detection of presence of contact), and calculates coordinates on the screen 21 where there was the contact in a case where there was the contact on the touch panel 20. Since it is necessary for each detection value by the entirety of the light sensors 24a and 25a to be read one way, the calculation is required for some time. With this, the control unit 41 can obtain information of coordinates equal to or greater than one place where there was the contact on the screen 21.

In step S320, the control unit 41 outputs a completion notification signal for notifying the control circuit 50 of the calculation completion of the coordinates, by an interrupt (INT), through the I/F unit 43 and the third wiring 62.

After receiving the touch notification signal (step S200), the control circuit 50 determines whether or not the completion notification signal is received from the arithmetic circuit 40 (step S210), and proceeds to step S220 in a case where the completion notification signal is received.

In step S220, the control circuit 50 reads a result of the calculation by the arithmetic circuit 40, that is, the information of the coordinates where there was the contact on the touch panel 20 from the arithmetic circuit 40. In this case, the control circuit 50 requests the information of the coordinates to the arithmetic circuit 40 via the third wiring 62.

The control unit 41 of the arithmetic circuit 40 that has received the request via the third wiring 62 and the I/F unit 43 outputs the information of the coordinates obtained in step S310 to the control circuit 50 via the I/F unit 43 and the third wiring 62 (step S330).

By the above processing, the control circuit 50 obtains the information of the coordinates where there was the contact on the touch panel 20. The control circuit 50 can proceed predetermined processing (for example, display or the like of predetermined image on the screen 21) according to the information.

Processing including step S210 and step S320 of FIG. 2 is only one example, and step S210 and step S320 may be omitted.

FIG. 3 exemplifies processing not including step S210 and step S320 when compared with FIG. 2 by a flowchart. That is, according to the example of FIG. 3, the control unit 41 does not transmit the completion notification signal to the control circuit 50, after the calculation of the coordinates is completed (after completion of step S310). The control circuit 50 immediately performs step S220, after the touch notification signal is received (step S200). However, at a time when the control circuit 50 requests the information of the coordinates to the arithmetic circuit 40 via the third wiring 62, there is a possibility that the calculation of the coordinates is not completed. If the calculation of the coordinates is completed at a time when the request is received, the control unit 41 of the arithmetic circuit 40 immediately transmits the information of the coordinates according to the request, and if the calculation of the coordinates is not completed at a time when the request is received, the control unit 41 immediately transmits the information of the coordinates after the calculation is completed (step S330).

As described above, according to the embodiment, in a case where a touch panel 20 is operated, the drive circuit 30 outputs information for calculating operation content on the touch panel 20 to the arithmetic circuit 40 by the first wiring 60 for connecting the drive circuit 30 and the arithmetic circuit 40 (step S150), and outputs a signal (touch notification signal) indicating that the touch panel 20 is operated to the control circuit 50 by the second wiring 61 for connecting the drive circuit 30 and the control circuit 50. That is, the drive circuit 30 determines the presence or absence of the contact on the touch panel 20, and immediately transmits the touch notification signal to the control circuit 50 in a case where there is the contact. With this, the control circuit 50 can recognize the fact that there was contact on the touch panel 20, at a timing certainly earlier than a timing when the arithmetic circuit 40 completes the calculation of the coordinates (completes step S310).

In the related art, as described above, there is no configuration where the touch notification signal is output from the drive circuit to the control circuit, and the arithmetic circuit notifies the control circuit of the fact that there was the contact on the touch panel, at a timing when the calculation of the coordinates is completed. The control circuit recognizes the fact that there was the contact on the touch panel by receiving the notification, and obtains the information of the coordinates from the arithmetic circuit, after the recognition. That is, in the related art, a predetermined long time is required until the control circuit actually obtains the information of the coordinates after the arithmetic circuit completes the calculation of the coordinates. On the other hand, in the embodiment as described above, the control circuit 50 recognizes the fact that there was the contact on the touch panel 20, before the arithmetic circuit 40 completes the calculation of the coordinates. Therefore, in the control circuit 50 side, it is possible to reduce a time, more than the related art, required until ready to obtain the information of the coordinates from the arithmetic circuit 40 is provided before completing the calculation of the coordinates and the control circuit 50 obtains the information of the coordinates according to the completion of the calculation of the coordinates by the arithmetic circuit 40. This means that in view of the users, an effect in which a time until the display device 10 starts processing according to the operation by operating the touch panel 20 is reduced, can be obtained.

In the embodiment, it can be mentioned that a remarkable effect is obtained when the display device 10 returns from the sleep state to the normal state. The arithmetic circuit starts the calculation of the coordinates or the like, as a response to the detection value being received from the drive circuit, and notifies the control circuit of the fact that there was the contact on the touch panel, at a timing of completing the calculation. If the control circuit is in the sleep state, the control circuit in the sleep state returns from the sleep state to the normal state, by first receiving the notification. Accordingly, the control circuit starts the processing in which the information of the coordinates is obtained from the arithmetic circuit, after the return to the normal state is completed. In this case, when a time required for returning from the sleep state to the normal state of the control circuit is considered, a time taken until the control circuit actually obtains the information of the coordinates is required, after the arithmetic circuit completes the calculation of the coordinates. According to the embodiment, the control circuit 50 in the sleep state returns to the normal state, by the touch notification signal, before the arithmetic circuit 40 completes the calculation of the coordinates, and recognizes the fact that there was the contact on the touch panel 20. Therefore, an effect that a time until the display device 10 starts processing according to the operation according to a user operating the touch panel 20 of the display device 10 in the sleep state is greatly reduced, can be obtained.

In addition, there is also a case where the arithmetic circuit in which the detection value is received from the drive circuit determines the presence or absence of the contact on the touch panel. In this case, even if the display device is in the sleep state, it is necessary that the drive circuit and the arithmetic circuit are driven in a state approximately close to the normal state, and the power consumption effect is reduced. In the embodiment, since the drive circuit 30 determines the presence or absence of the contact on the touch panel 20, it is possible to stop a function (at least function of the calculation) of the arithmetic circuit 40 in the sleep state. With this, it is possible to achieve the effect of higher power consumption.

In the example of FIG. 1, the second wiring 61 is a wiring for connecting the drive circuit 30 and the control circuit 50, without going through the arithmetic circuit 40. According to the configuration, the second wiring 61 is easily shortened without going through the arithmetic circuit 40. However, as another example included in the embodiment, the second wiring 61 may go through another circuit (for example, arithmetic circuit 40) other than the drive circuit 30 and the control circuit 50. That is, the second wiring 61 for connecting the drive circuit 30 and the control circuit 50 may apparently go through another circuit in the circuits. However, the another circuit referred to herein is a circuit which does not disconnect the communication in the second wiring 61.

The invention is not limited to the above embodiment, it is possible to implement the invention in various forms without departing from the scope of the invention. For example, the invention is also applied to the display device including a touch panel for adopting a method other than an optical method, for example, a capacitance method or a resistance film method. In addition, the invention can adopt the following modification.

FIG. 4 illustrates a different example from FIG. 1 in the display device 10 according to the embodiment by a block diagram. An illuminance sensor 70 and a proximity sensor 80 are added to a configuration of the display device 10 illustrated in FIG. 4, when compared to the display device 10 illustrated in FIG. 1. The illuminance sensor 70 and the proximity sensor 80 are examples of a detector for detecting a predetermined change of the external environment. However, the display device 10 may include only one of the illuminance sensor 70 and the proximity sensor 80. In addition, various sensors other than the illuminance sensor 70 and the proximity sensor 80 may also be included in the detector.

The illuminance sensor 70 and the proximity sensor 80 are controlled by the drive circuit 30. Specifically, the illuminance sensor 70 and the proximity sensor 80 are driven by a current supplied from the demultiplexer 33. The illuminance sensor 70 responds to the surrounding brightness and outputs a specific detection signal to the multiplexer 35 in a case where the periphery becomes equal to or greater than a predetermined brightness. In addition, the proximity sensor 80 is, for example, a human sensor for detecting the approaching of a person using infrared, and outputs a specific detection signal to the multiplexer 35 when the approaching of a person (moving object) is detected. The specific detection signal is output to the control unit 31 via the multiplexer 35 and the current detection unit 34. When the specific detection signal is received, for example, in a case where a predetermined change (as compared with latest brightness or distance stored in control unit 31 in advance, change such as periphery of the display device 10 becoming bright, human approaching to the display device 10 or the like) is detected by the detector (illuminance sensor 70 or proximity sensor 80), the control unit 31 outputs the same signal as a signal (touch notification signal) indicating that the touch panel 20 is operated to the control circuit 50 through the second wiring 61. It is possible to appropriately set a condition of whether or not the specific detection signal is output.

There is no particular difference between the same signal as the touch notification signal and the touch notification signal, and the same signal as the touch notification signal is a touch notification signal itself when viewed from the control circuit 50 which receives the signal. However, at a time when the illuminance sensor 70 or the proximity sensor 80 outputs the specific detection signal, since it is not limited that the touch panel 20 is operated, it is conveniently represented as the same signal as the signal (touch notification signal) indicating that the touch panel 20 is operated, here. That is, in a case where it is determined that there was the contact on the touch panel 20 ("Yes" in step S130 of FIGS. 2 and 3), the control unit 31 outputs the touch notification signal to the control circuit 50 through the second wiring 61. However, even in a case where the specific detection signal is received, the control unit 31 outputs the touch notification signal (the same signal as touch notification signal) to the control circuit 50 through the second wiring 61. According to the modification example, in a case where it is strongly estimated that the periphery of the display device 10 becomes bright or a human approaches the display device 10 such that the touch panel 20 will be operated soon, it is possible that the notification to the control circuit 50 is performed at a timing earlier than the timing when the touch panel 20 is actually operated and the control circuit 50 is quickly returned from the sleep state to the normal state if the control circuit 50 is in the sleep state.

As described in FIG. 4, in a case where the display device 10 includes the illuminance sensor 70 and the proximity sensor 80, a configuration in which the control unit 31 receives the specific detection signal in a case where both the illuminance sensor 70 and the proximity sensor 80 output the specific detection signal to the multiplexer 35, may be implemented.

In addition, in the sleep state, the notification is performed from the drive circuit 30 to the control circuit 50 through the second wiring 61 described above. However, in the normal state, the arithmetic circuit 40 may determine the presence or absence of the contact on the touch panel without using the second wiring 61, and notify the control circuit 50 that there was the contact on the touch panel. In this case, it is possible to leave the configuration of the related art in the normal state, and increase speed of returning from the sleep state with large effect.

What is claimed is:

1. A display device comprising:
   a touch panel;
   a drive circuit that controls the touch panel;
   an arithmetic circuit that calculates operation content on the touch panel based on an output of the drive circuit; and
   a control circuit,
   wherein the drive circuit includes a first wiring for outputting information for calculating the operation content on the touch panel to the arithmetic circuit, and a second wiring for outputting a signal indicating that the touch panel is operated to the control circuit, and
   the control circuit is configured to receive a calculation result from the arithmetic circuit, and control the display device based on the signal received through the second wiring and the calculation result.

2. The display device according to claim 1,
   wherein the second wiring is a wiring for connecting the drive circuit and the control circuit not through the arithmetic circuit, and transmitting the signal from the drive circuit to the control circuit.

3. The display device according to claim 1,
   wherein the control circuit is configured to instruct the arithmetic circuit to transition to a sleep state,
   the arithmetic circuit transitions to the sleep state by stopping at least a function of the calculation in a case where the arithmetic circuit is instructed to transition to the sleep state, and
   the drive circuit returns the arithmetic circuit from the sleep state by outputting the information for calculating operation content on the touch panel to the arithmetic circuit through the first wiring in a case where the touch panel is operated.

4. The display device according to claim 1, further comprising:
   a detector that detects a predetermined change of an external environment,
   wherein in a case where the predetermined change is detected by the detector, the drive circuit outputs a signal equivalent to the signal indicating that the touch panel is operated to the control circuit through the second wiring.

5. A communication method performed by a display device including a touch panel, a drive circuit that controls the touch panel, an arithmetic circuit that calculates operation content on the touch panel based on an output of the drive circuit, and a control circuit, the method comprising:
   causing the drive circuit to output information for calculating operation content on the touch panel to the arithmetic circuit through a first wiring for connecting the drive circuit and the arithmetic circuit, and to output a signal indicating that the touch panel is operated to the control circuit through a second wiring for connecting the drive circuit and the control circuit, and
   causing the control circuit to receive a calculation result from the arithmetic circuit, and control the display device based on the signal received through the second wiring and the calculation result.

6. The display device according to claim 1,
   wherein the control circuit is further configured to cause the touch panel to display a predetermined image based on the received calculation result.

* * * * *